(12) United States Patent
Takahashi et al.

(10) Patent No.: US 7,798,729 B2
(45) Date of Patent: Sep. 21, 2010

(54) FOCAL-PLANE SHUTTER

(75) Inventors: Hiroshi Takahashi, Narashino (JP); Yoichi Nakano, Narashino (JP); Chiaki Nemoto, Narashino (JP)

(73) Assignee: Seiko Precision Inc., Narashino-shi (JP)

( * ) Notice: Subject to any disclaimer, the term of this patent is extended or adjusted under 35 U.S.C. 154(b) by 254 days.

(21) Appl. No.: 12/076,911

(22) Filed: Mar. 25, 2008

(65) Prior Publication Data

US 2008/0240708 A1 Oct. 2, 2008

(30) Foreign Application Priority Data

Mar. 27, 2007 (JP) .............................. 2007-082060

(51) Int. Cl.
*G03B 9/40* (2006.01)
(52) U.S. Cl. ...................................... 396/486
(58) Field of Classification Search ................. 396/452, 396/458, 460, 462, 471, 479, 480, 483–489, 396/491, 492, 494
See application file for complete search history.

(56) References Cited

U.S. PATENT DOCUMENTS 5,739,962 A * 4/1998 Asakura et al. ............. 359/700
6,089,760 A * 7/2000 Terada ........................ 396/463
2002/0136556 A1* 9/2002 Nomura et al. ............. 396/458
2004/0042787 A1* 3/2004 Miyazaki .................... 396/484
2005/0254815 A1* 11/2005 Sakamoto ................... 396/462

FOREIGN PATENT DOCUMENTS

JP 3224786 8/2001
JP 2008-158304 7/2008

OTHER PUBLICATIONS

Translation of JP Publication No. 08-069029; Focal Plane Shutter for Camera; Takahashi, Shigemi; Mar. 12, 1996.*
Office Action issued on the corresponding Japanese Patent Application No. 2007-082060 dated Dec. 16, 2008—Notice of Reason(s) for Refusal w/full English translation.

* cited by examiner

*Primary Examiner*—Rodney E Fuller
*Assistant Examiner*—Fang-Chi Chang
(74) *Attorney, Agent, or Firm*—Kratz, Quintos & Hanson, LLP

(57) ABSTRACT

A focal-plane shutter has a first plate having a first opening, a second plate having a second opening, a shutter blade disposed between the first plate and the second plate, for opening and closing the first opening and the second opening, and a thin plate disposed at a side of the first plate facing the shutter blade and extending in such a direction that the shutter blade travel. A distance between an edge of the first opening and a center of the first opening is greater than that between an edge of the thin plate and the center of the first opening.

3 Claims, 6 Drawing Sheets

US 7,798,729 B2

FOCAL-PLANE SHUTTER

BACKGROUND OF THE INVENTION

1. Field of the Invention

The present invention relates to focal-plane shutters.

2. Description of the Related Art

Conventionally, referring to Japanese Patent No. 3224786, there has been known a focal-plane shutter as employed in a single-lens reflex camera. FIGS. 1 and 2 illustrate such a conventional focal-plane shutter. FIG. 1 is a front view of the conventional focal-plane shutter, and FIG. 2 is a sectional view showing an essential part of the conventional focal-plane shutter. The conventional focal-plane shutter includes a shutter base plate 10x, a supporting plate 20x, a partition plate 30x, a thin plate 40x, a leading shutter 50x, a following shutter 60x, and a driving mechanism 70x. A printed circuit board 91x is located at the back side of the focal-plane shutter. An image pickup device 90x is mounted on the printed circuit board 91x.

The shutter base plate 10x is located at an object side. The supporting plate 20x is located at an image side. A blade chamber which accommodates the leading shutter 50x and the following shutter 60x is defined by the shutter base plate 10x and the supporting plate 20x. The partition plate 30x is located between the leading shutter 50x and the following shutter 60x. The thin plate 40x is provided between the shutter base plate 10x and the leading shutter 50x. The thin plate 40x prevents the fluttering of distal end of the leading shutter 50x or the following shutter 60x when the leading shutter 50x or the following shutter 60x travels.

The leading shutter 50x is connected to arm members 81x and 82x, and actuation of the arm members 81x and 82x opens and closes an opening 11x. Likewise, the following shutter 60x is connected to arm members 83x and 84x, and actuation of the arm members 83x and 84x opens and closes the opening 11x. The driving mechanism 70x drives the arm members 81x to 84x.

A mirror box M is disposed at the object side of the shutter base plate 10x, and represented by alternate long and short dashed lines in FIG. 2. As shown in FIG. 2, a sloping surface 12x is formed at an edge of the opening 11x and inclined upward from the shutter chamber to the object side.

Incidentally, the focal-plane shutter is also employed in a recent digital camera. As a high pixel density of the digital camera, even if a little dust attaches to the image pickup device, image quality may be adversely affected.

Therefore, periodical maintenance is required for this camera. For example, brush for sweeping or the like is inserted into the opening of the shutter base plate from the object side, and removing the dust attached to the image pickup device is needed.

However, in the conventional focal-plane shutter, as shown in FIG. 2, the shape of the edge of the opening 11x at the object side is not supposed for the insertion of such the cleaning tool. Additionally, in the cases where the shutter base plate or proximity of the opening is made of resin, it is difficult to manufacture the proximity of the opening to be thin. This does not allow the proximity of the opening to be thin, thus reducing a space for insertion of the cleaning tool and making the insertion of the cleaning tool difficult.

Hence, periodical maintenance is required for maintaining the image quality. Thus, it is preferable that the maintenance operation should be performed with ease.

SUMMARY OF THE INVENTION

It is therefore an object of the present invention to provide a focal-plane shutter for improving the workability of the maintenance operation.

According to an aspect of the present invention, there is provided a focal-plane shutter having a first plate having a first opening, a second plate having a second opening, a shutter blade disposed between the first plate and the second plate, for opening and closing the first opening and the second opening, and a thin plate disposed at a side of the first plate facing the shutter blade and extending in such a direction that the shutter blade travels, a distance between an edge of the first opening and a center of the first opening being greater than that between an edge of the thin plate and the center of the first opening.

In the above configuration, the space is obtained in the side of the first plate, thus facilitating the insertion of the cleaning tool at the time of the maintenance operation. This improves the workability of the maintenance operation.

DETAILED DESCRIPTION OF THE PREFERRED EMBODIMENTS

An embodiment of the present invention will be described below with reference to the accompanying drawings.

Figure 3:
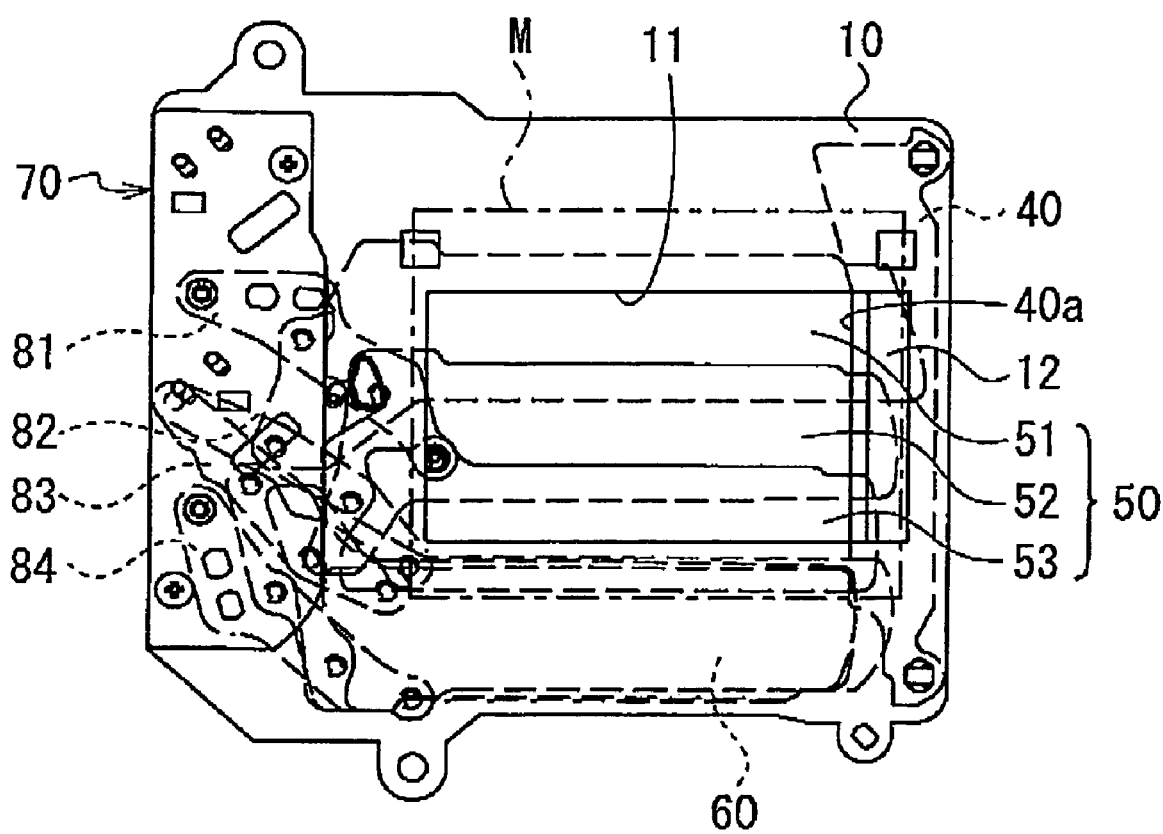
FIG. 3 is a front view showing a focal-plane shutter in accordance with the present embodiment.
Figure 4:
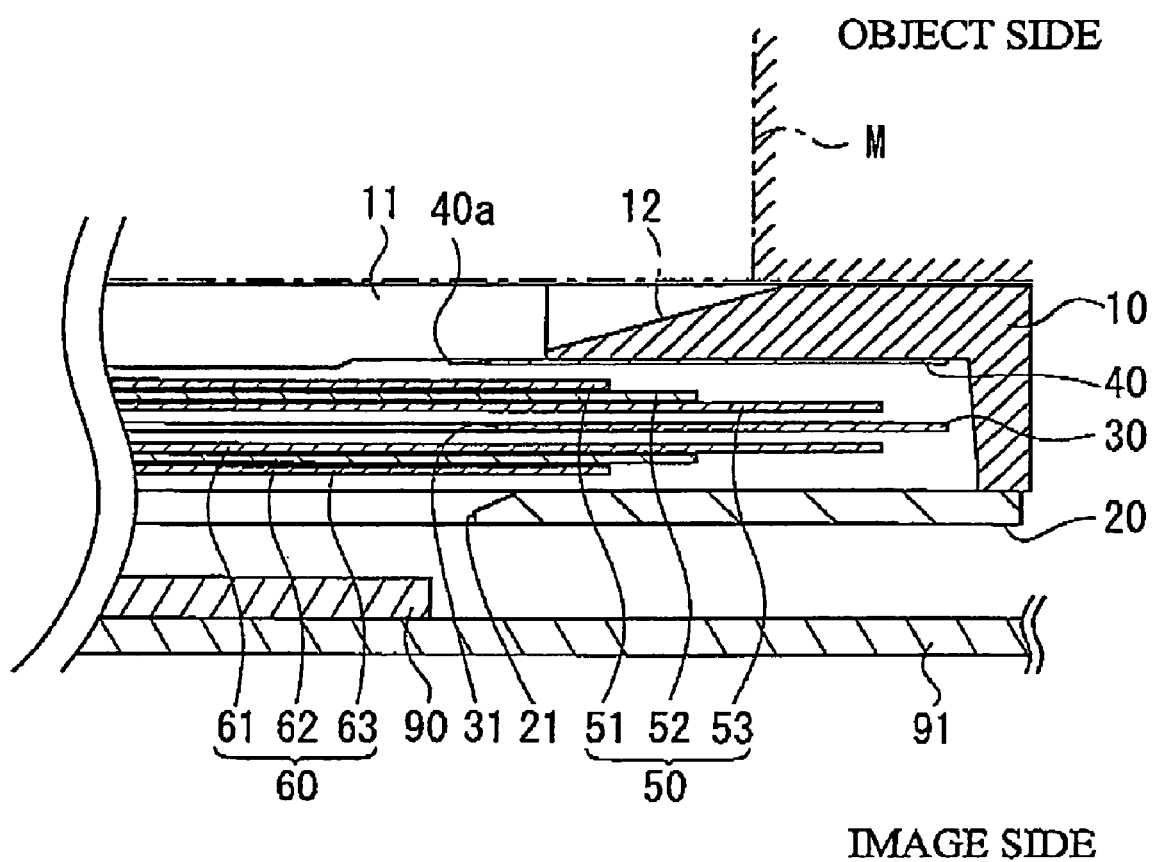
FIG. 4 is a sectional view showing an essential part of the focal-plane shutter in accordance with the present embodiment.

FIG. 3 is a front view showing a focal-plane shutter in accordance with the present embodiment. FIG. 4 is a sectional view showing a part of the focal-plane shutter in accordance with the present embodiment. Moreover, FIG. 3 shows that a leading shutter is in a spread state and a following shutter is in an overlapped state.

The focal-plane shutter includes a shutter base plate 10, a supporting plate 20, a partition plate 30, a thin plate 40, a leading shutter 50, a following shutter 60, and a driving mechanism 70.

The shutter base plate 10 is made of resin. The shutter base plate 10 has a rectangular opening 11 at a center thereof. As shown in FIGS. 3 and 4, a sloping surface 12 is formed on an edge of the opening 11. The shutter base plate 10 is disposed at an object side.

The supporting plate 20 is made of a metal plate. Like the shutter base plate 10, the supporting plate 20 has a rectangular opening 21 at a center thereof. The supporting plate 20 is disposed at an image side. A blade chamber which accommodates the leading shutter 50 and the following shutter 60 is defined by the shutter base plate 10 and the supporting plate 20. The supporting plate 20 is disposed at the image side.

The partition plate 30 is located between the leading shutter 50 and the following shutter 60. The partition plate 30 prevents the interference of the leading shutter 50 with the following shutter 60. Likewise, the partition plate 30 has a rectangular opening 31.

The leading shutter 50 is composed of three shutter blades 51 to 53. Likewise, the following shutter 60 is composed of shutter blades 61 to 63. As shown in FIG. 4, the thin plate 40 made of metal is located between the shutter base plate 10 and the leading shutter 50.

The leading shutter 50 is connected to arm members 81 and 82. A parallel linkage is defined by the arm members 81 and 82. Actuation of the arm members 81 and 82 converts the overlapped state into the spread state. Specifically, proximal ends of the shutter blades 61 to 53 are connected to the arm members 81 and 82 with pins.

Like the leading shutter 50, the following shutter 60 is connected to the arm members 83 and 84 and the following shutter 60 is shifted from the overlapped state to the spread state. Proximal ends of the shutter blades 61 to 63 are connected to the arm members 83 and 84 with pins.

The arm members 81 to 64 serve as a driving member causing the leading shutter 50 and the following shutter 60 to travel. The leading shutter 50 and the following shutter 60 travel between the spread state and the overlapped state, so that the opening 11 is opened or closed. The driving mechanism 70 is for driving the arm members 81 to 84.

In FIG. 4, an image pickup device 90 which receives objective light and forms an image is located at a lower side of the supporting plate 20. The image pickup device 90 is mounted on a printed circuit board 91.

A mirror box M is disposed at the object side of the shutter base plate 10 and is indicated by alternate long and short dashed lines in FIGS. 3 and 4. In a typical state, the mirror box M guides the objective light to eyepiece viewed by the user. In a shoot state, the mirror box M drives a mirror, not shown, for guiding the objective light to the image pickup device.

Primary action of the focal-plane shutter will be described below. As to an initial state shown in FIG. 3, the leading shutter 50 is in the spread state in which each of edges of adjacent shutter blades among the shutter blades 51 to 53 is overlapped. The following shutter 60 is in the overlapped state in which the shutter blades 61 to 63 are overlapped one another and opens the opening 11. A release button (not shown) is pushed, thus causing the leading shutter 50 to open the opening 11 in such a manner that the leading shutter 50 is the overlapped state. Additionally, the leading shutter 50 travels in an upper direction in FIG. 3. After the opening 11 begins to be opened, the following shutter 60 travels from the overlapped state to the spread state at a time lag corresponding to a suitable exposure time. Then, the opening 11 is closed. Additionally, the following shutter 60 travels in the upper direction in FIG. 3.

Figure 1:
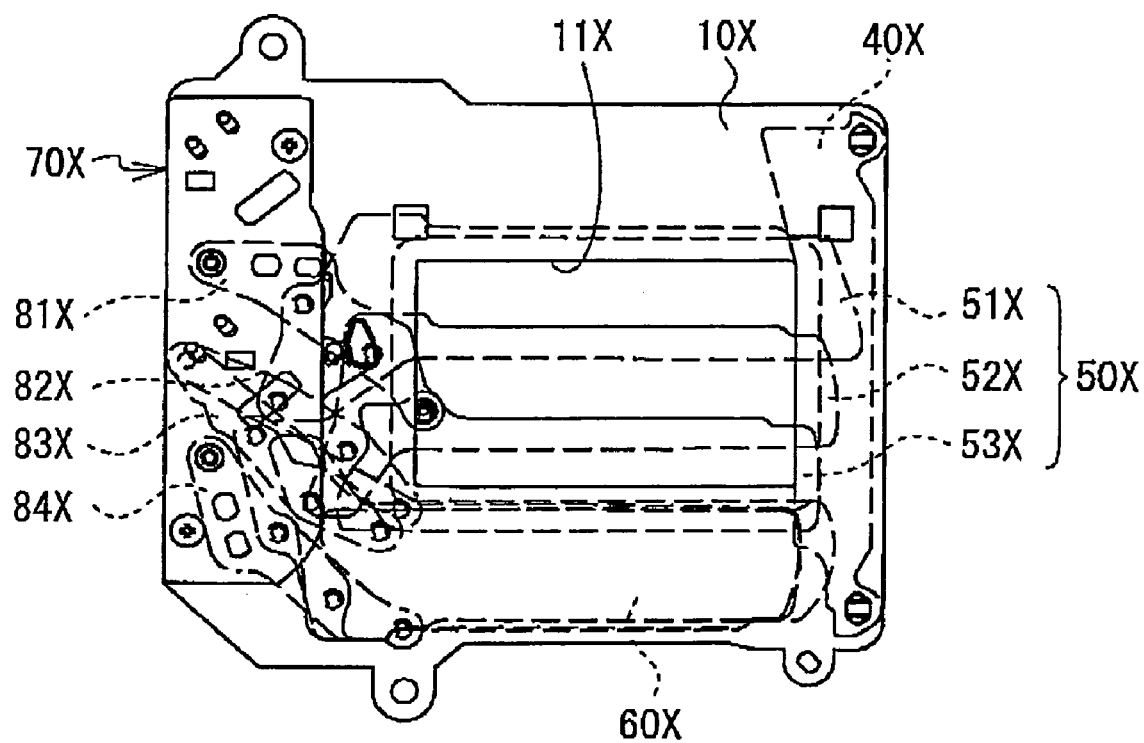
FIG. 1 illustrates a conventional focal-plane shutter.
Figure 2:
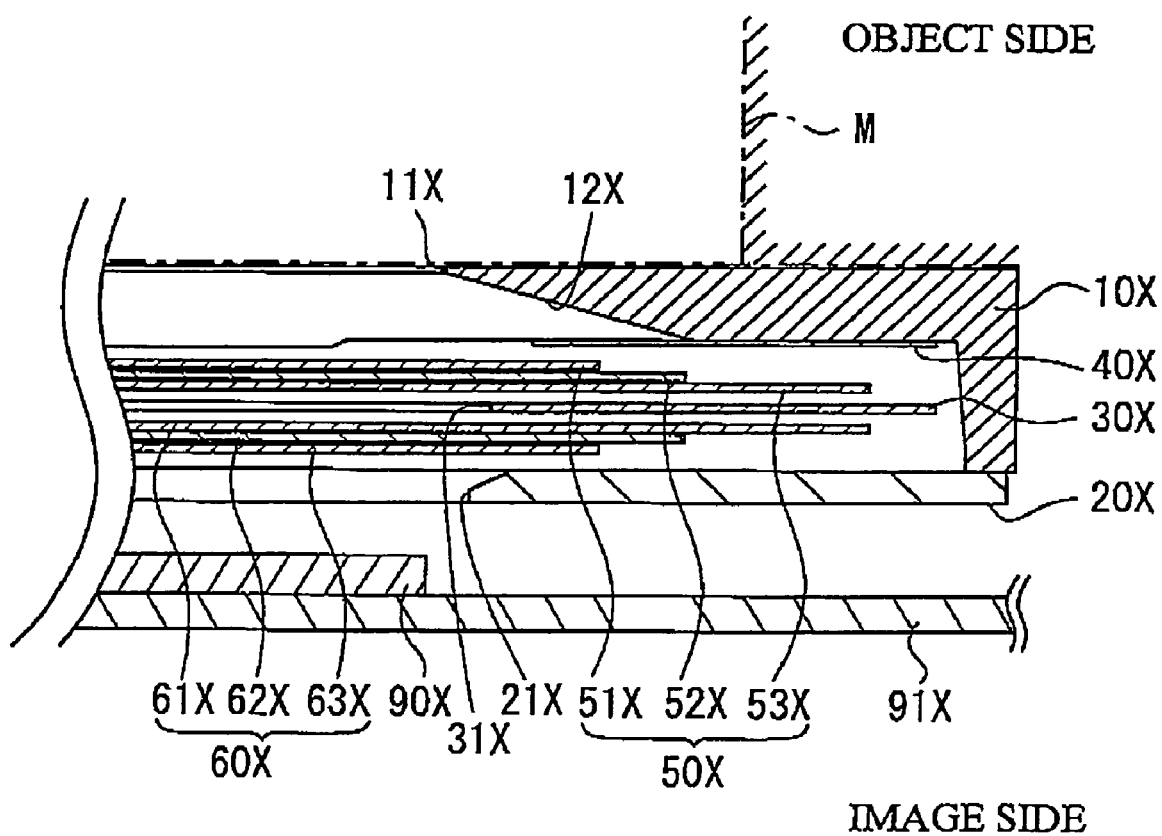
FIG. 2 illustrates the conventional focal-plane shutter.

The sloping surface 12 will be described below. As shown in FIGS. 3 and 4, the sloping surface 12 is formed at an edge of one side of the opening 11. The sloping surface 12 is declined toward the supporting plate 20 from an outside of the opening 11 to a center of the opening 11. That is, the thickness of the sloping surface 12 begins to increase as being away from a center of the opening 11. The position where the sloping surface 12 is provided is apart from the center of the opening 11, as compared to that of the conventional art as shown in FIGS. 1 and 2. The position of an edge 40a, closer to the opening 11, of the thin plate 40 as mentioned later is the same as the position of the edge of the conventional opening as shown in FIGS. 1 and 2.

That is to say, the edge 40a of the thin plate 40 partially defines an opening for shooting. Since the thin plate 40 may be formed to be thinner than the shutter base plate 10 made of resin, light is hardly reflected by the edge 40a. This rarely causes the flare, as compared to cases where the opening for shooting is defined by only the shutter base plate 10. Edges of the opening 11 other than the edge in which the sloping surface 12 is formed are formed vertically.

Such a configuration of the sloping surface 12 facilitates the insertion of the cleaning tool, such as a brush for cleaning, into the opening 11. This improves the workability of removing the dust attached to the image pickup device 90 disposed at the back side of the supporting plate 20. This is, even if the cleaning tool is inserted into the opening 11 from the object side of the sloping surface 12, the sloping surface 12 can guide the cleaning tool to the center of the opening 11 with facility, because the sloping surface 12 is inclined downward. This arrangement improves the workability of the maintenance operation.

Even if the sloping surface 12 is not provided, the enlargement of the opening 11 may improve the workability of the maintenance operation. However, the enlarged opening 11 may lead to an increased size of the focal-plane shutter. Therefore, the provision of the sloping surface 12 prevents the upsizing of the focal-plane shutter and improves the workability of the maintenance.

Figure 6:
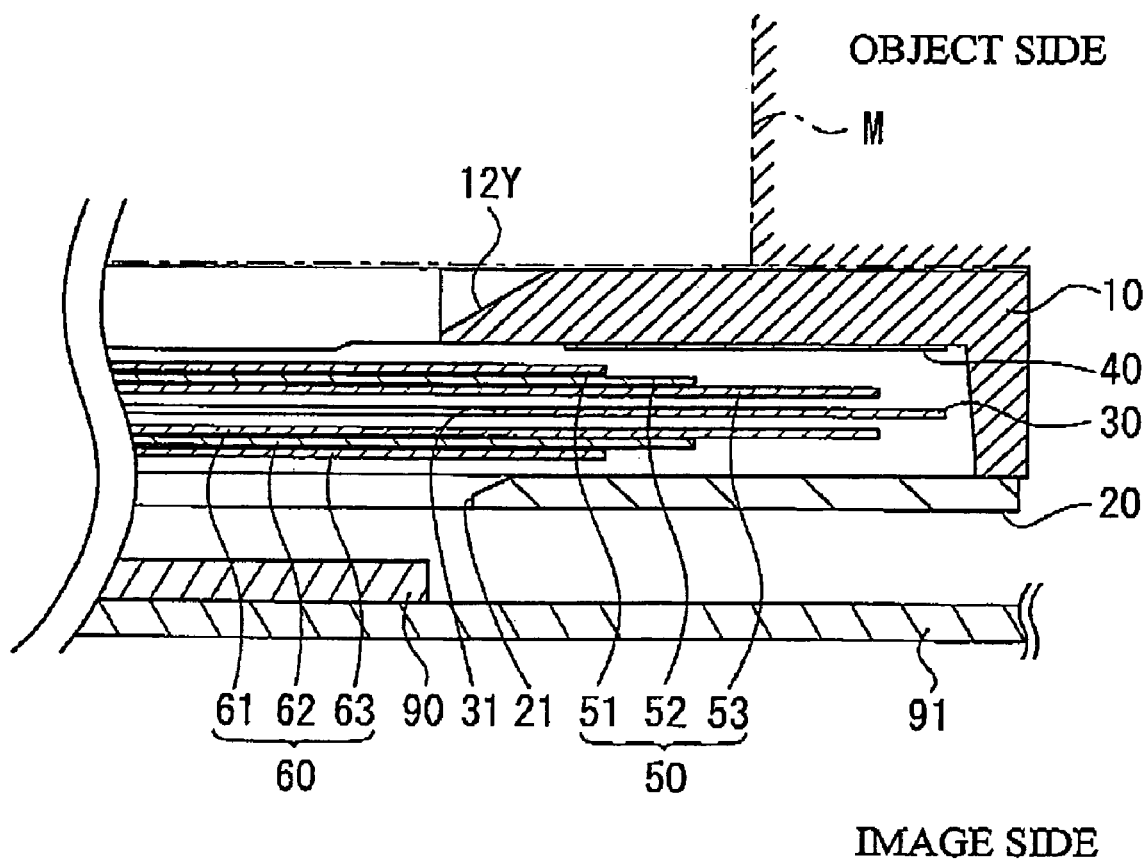
FIG. 6 illustrates a circumference of a sloping surface.

Furthermore, the sloping surface 12 has a function for preventing a secondary light reflected by the mirror box M from reaching the image pickup device 90. This will be described below with reference to FIG. 6. The same portions as in FIG. 4 are given the same reference numerals and a description thereof will be omitted. If it is attempted to merely facilitate the insertion of the cleaning tool, a sloping surface 12Y may be formed at the edge of the opening 11 of the shutter base plate 10 disposed at the object side, as shown in FIG. 4. However, if the sloping surface 12Y is formed at the edge of the opening of the shutter base plate 10 disposed at the object side, a partial reflected light by the mirror box M may be further reflected by the sloping surface 12Y and entered to the image pickup device. This is undesirable because of the cause of the flare.

Consequently, as shown in FIG. 4, the sloping surface 12 is extended to an outside of the mirror box M. With such a configuration, the reflected light by the mirror box M is incident to the sloping surface 12 at a smaller incident angle. For this reason, the reflection angle of the light reflected by the sloping surface 12 becomes smaller, so that the reflected light hardly directs toward the image pickup device 90. Therefore, the focal-plane shutter is configured such that the cleaning tool is guided to the opening 11 and the flare is prevented.

The thin plate 40 will be described below. The thin plate 40 is mounted on the image side of the shutter base plate 10. The thin plate 40 is located between the shutter base plate 10 and distal end of the leading shutter 50. As shown in FIG. 3, the thin plate 40 extends in such a direction in which the leading shutter 50 and the following shutter 60 travel. Further, a distance between the edge 40a of the thin plate 40 and the center of the opening 11 is shorter than that between the sloping surface 12, which defines one side of the opening for shooting, and the center of the opening 11. Namely, the thin plate 40 broadly covers the distal end of the leading shutter 50. With such a configuration, the thin plate 40 prevents deflection of the leading shutter 50 and the flattering of the distal end of the leading shutter 50 in conjunction with the traveling of the leading shutter 50.

Figure 5:
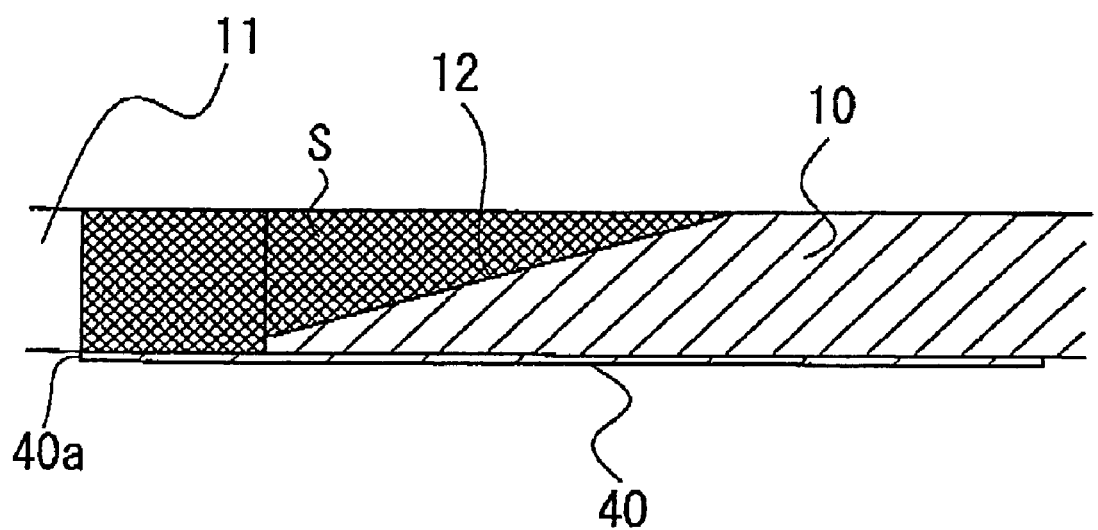
FIG. 5 is an enlarged view showing an end of the thin plate.

FIG. 5 is an enlarged view showing an end of the thin plate 40. The edge, close to the opening, of the thin plate 40 is disposed to be exposed through the opening 11. That is, as shown in FIG. 2, the thin plate 40 is disposed to project toward the center of the opening relative to the edges of the openings 11, 21 and 31. The thin plate 40 thus arranged functions to define an optical path for shooting.

With such a configuration, as shown in FIG. 5, the space as large as the region S is obtained, as compared to the conventional art as shown in FIGS. 1 and 2, thus facilitating the insertion of the cleaning tool for the space. Consequently, the thin plate 40 has multiple functions, thereby preventing the number of parts from increasing.

While the preferred embodiments of the present invention have been illustrated in detail, the present invention is not limited to the above-mentioned embodiments, and other embodiments, variations and modifications may be made without departing from the scope of the present invention.

In the above embodiment, the sloping surface 12 is formed at the edge of one side of the opening 11. Multiple sloping surfaces 12 may be formed at multiple sides of the opening 11, respectively. In the above embodiment, the shutter base plate 10 is disposed at the object side and the supporting plate 20 is disposed at the image side. The positional relationship of the shutter base plate 19 and the supporting plate 20 may be reversed so that the shutter base plate 10 is disposed at the image side and the supporting plate 20 is disposed at the object side. The supporting plate 20 may be made of resin.

The present application is based on Japanese Patent Application No. 2007-082060 filed Mar. 27, 2007, the entire disclosure of which is hereby incorporated by reference.

What is claimed is:

1. A focal-plane shutter comprising:
   a first plate having a first opening;
   a second plate having a second opening;
   a shutter blade disposed between the first plate and the second plate, for opening and closing the first opening and the second opening; and
   a thin plate disposed at a side of the first plate facing the shutter blade and extending in such a direction that the shutter blade travels,
   a distance between an edge of the first opening and a center of the first opening being greater than that between an edge of the thin plate and the center of the first opening,
   wherein the first plate has a facing side facing the shutter blade and a reverse side of the facing side, and the first plate is provided with a sloping surface at the edge of the first opening, the sloping surface being provided at the reverse side,
   wherein the sloping surface is provided at an object side of the first plate and is extended to an outside of an opening of a mirror box disposed at the object side of the first plate.

2. The focal-plane shutter according to claim 1, wherein at least one of the first plate and the second plate is made of resin.

3. The focal-plane shutter according to claim 1, wherein a distance between an edge of the second opening and a center of the second opening is greater than that between the edge of the thin plate and the center of the second opening.

* * * * *